Nov. 18, 1941.  T. G. CUNNING  2,263,030
FRUIT WASHER
Filed March 13, 1940  2 Sheets-Sheet 1
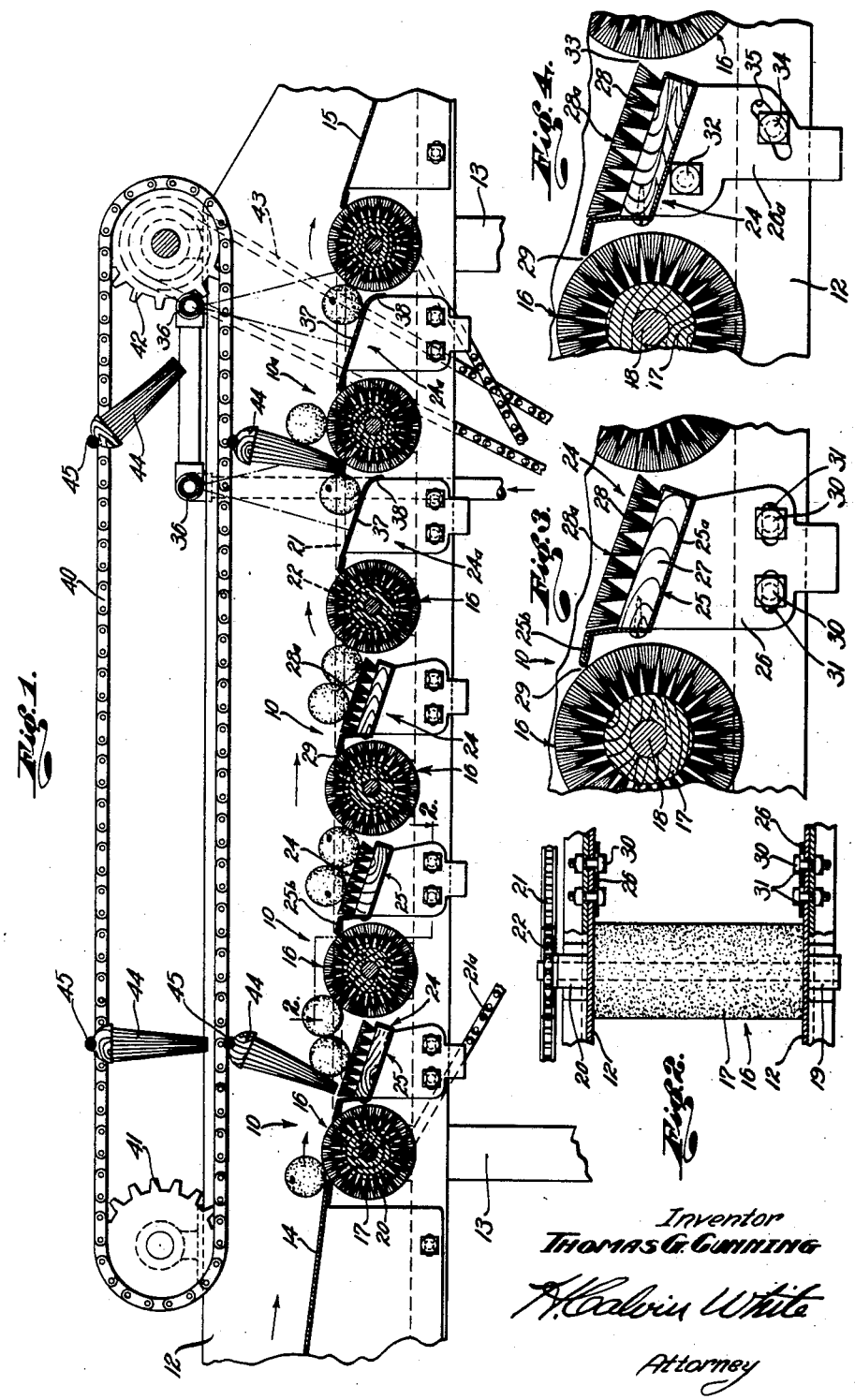
Inventor
THOMAS G. CUNNING
H. Calvin White
Attorney

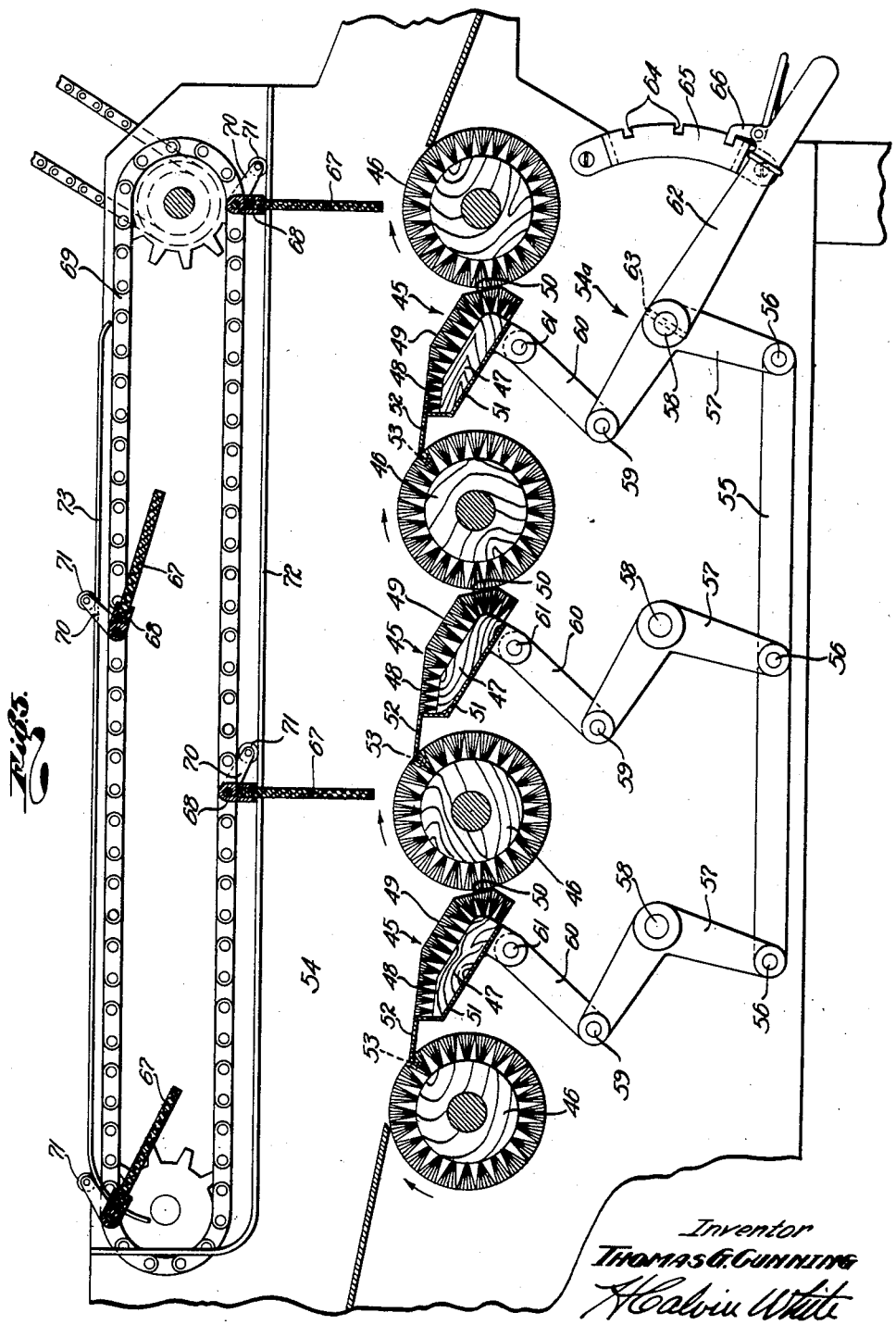

& GENERAL CLEANING,

Patented Nov. 18, 1941

2,263,030

UNITED STATES PATENT OFFICE 2,263,030

FRUIT WASHER

Thomas G. Cunning, Upland, Calif.

Application March 13, 1940, Serial No. 323,759

8 Claims. (Cl. 146—202)

This invention has to do generally with fruit treating apparatus in which the fruit is advanced along a course of travel over a series of rolls rotating in the direction of travel of the fruit, and has for its primary object to provide an improved apparatus of this type having the advantages of lower cost construction and operation, as well as more efficient action of the fruit being treated. The invention is particularly applicable to fruit washers, although it is also adaptable to other operations, as will hereinafter appear.

The invention may be more particularly characterized as relating to apparatus in which the fruit travels over spaced rollers, ordinarily elongated cylindric brushes, between which are placed what may be referred to as intervening supports, and over which the fruit moves between contacts with successive brushes. One form of apparatus of this general type has been proposed in which the intervening supports are mounted for movement so as to receive the fruit from a preceding roll or brush while in a position at which the fruit will not roll on to the next brush, and then tilt to an angle at which the fruit will roll forward against that next brush. Return movement of the support to its original position serves to elevate the fruit sufficiently to enable it to be carried over by the brush. Accordingly, the moving supports serve primarily as a means for advancing the fruit through the machine.

This type of action has the disadvantage, aside from mechanical complications and relatively high initial and maintenance costs, of undesirably reducing the length of time the fruit is maintained in actual contact with the brushes, because of the delay in advancement of the fruit from one brush to the next by the movement of the intervening supports. In accordance with the invention, this type of machine has been materially simplified and its effectiveness increased by reason of two principal features; first, the use of stationary (though adjustable) inclined surface supports between the rolls, and second, the use of means independent of the supports and rolls for advancing the fruit through the machine. By virtue of this construction, I am able to bring the fruit quickly from one roll to the next, thereby greatly increasing the length of time the fruit is engaged by and acted upon by the roll and the efficiency of the roll action, and also to enable the machine construction to be simplified and economized.

Further with respect to the efficiency of the roll action, practical operation of the invention has demonstrated its capacity for highly effective rubbing or brushing action on the fruit, and has shown that the efficiency of the machine in this respect is due in one important degree to the co-action between the fruit, the rotating rolls, and the intervening stationary inclined supports, under the influence of the overhead pushers when pressing the fruit against the supports and rolls. Application of pressure against the fruit by the pushers acts to increase the rubbing effectiveness of the rolls resulting not only from direct pressural engagement of the fruit against the rolls, but also from the increase in the roll speed with relation to the rotative speed of the fruit, caused by the fruit in the bottoms of the troughs being restrained against rotation by engagement with the stationary supports. And of course this restraint is increased in accordance with the pressure exerted by the overhead pushers, tending to wedge the fruit in the bottoms of the troughs.

The invention has numerous additional features and objects, but all these, as well as the details of certain typical and illustrative embodiments, will be better understood from the description to follow. Reference is had throughout the description to the accompanying drawings, in which:

Fig. 1 is a longitudinal sectional view, partly diagrammatical, illustrating a typical embodiment of the invention;

Fig. 2 is a fragmentary section on broken line 2—2 of Fig. 1;

Fig. 3 is a fragmentary enlargement showing one of the supporting members between a pair of rolls;

Fig. 4 is a view similar to Fig. 3 illustrating a variational type of adjustment for the supporting member; and Fig. 5 is a view generally similar to Fig. 1, illustrating a further variational form of the invention.

Referring first to Fig. 1, the apparatus comprises a series of alternate rolls and inclined fruit supporting members, generally indicated at 10, over which the fruit is advanced in a course of travel from left to right, as indicated by the arrow. As will be understood, the series 10 of rolls and supporting members may be mounted on any suitable support or frame structure. As illustrative, the frame is shown to comprise a pair of transversely spaced side plates 12 mounted on supports 13 and extending longitudinally the length of the series of rollers. At the forward end the frame carries an inclined surface 14 down which the fruit travels on to the first of the rolls, the discharge end of the machine similarly having an inclined surface 15 along which the treated fruit is taken for packing or other disposition.

The surface of the fruit is subjected to treatment by rotating elements, indicated at 16, which may be of any suitable type and form adapted to have a rubbing action on the fruit, and which may be referred to generally as rolls. Preferably these rolls consist of substantially cylindric brushes 17 extending transversely of the course of travel of the fruit and carried on shafts 18 journaled in bearings 19 and 20, see Fig. 2, supported by the frame members 12. The brushes 17 are rotatably driven at the same rate of speed and in the direction of movement of the fruit, by suitable means such as a chain 21 engaging sprockets 22 on the ends of the brush shafts 18, the lower spans 21a of the chain leading to a suitable power source.

Interposed between successive rolls are stationary supports, generally indicated at 24, one of the primary purposes of which is to provide supporting surfaces for the fruit while it is being acted upon by the rotating brushes, that will retard or restrain rotation of the fruit to the extent that the latter will not rotate at the same peripheral speed as the brushes, but sufficiently to enable all surfaces of the fruit to contact the brushes. One of the main features of improvement contemplated with respect to the supports 24, is the provision of a stationary surface below the tops of the brushes and inclined in the direction of travel of the fruit, that will cause the fruit overriding a brush onto the surface, to move immediately forward into contact with a succeeding brush. As previously explained, this feature is in distinction to apparatus heretofore proposed in which movable supporting members between the brushes are employed as a means of advancing the fruit, and in so doing involve and necessitate considerable delay between successive engagements of the fruit with the brushes.

Members 24 may be constructed to provide an inclined surface of any suitable character depending upon the desired action of the fruit. For certain purposes I may employ a bristle surface to obtain greater brushing action on the fruit and perhaps greater restraint against rotation under the influence of the rotating brushes 16, while for other purposes the inclined surfaces may be relatively smooth, all as will hereinafter appear. Certain of the supports 24 are shown each to comprise a channel-shaped metallic body 25 having an inclined base 25a and downwardly turned end flanges 26 serving as brackets to mount the members on the side plates 12 of the frame. Each channel body 25 contains a brush 27 extending transversely the width of brushes 16 and having bristles 28 presenting an inclined surface 28a. The body also carries an upwardly extending, slightly inclined flange 25b having narrow clearance at 29 from the brush at 16 over which the fruit travels in moving forwardly onto the support. It is important that the clearance at 29 be limited to preclude the possibility of small-size fruit lodging or passing downwardly between the flange and brush, and that provision be made for adjusting the support 24 to maintain this clearance, for example as the brush 15 wears or its bristles soften.

Accordingly, in Figs. 1 to 3 I show one form of such adjustment comprising a pair of bolts 30 extending through openings in the frame 12 and slots 31 in the flanges or brackets 26. By loosening the nuts on the bolts, the supports 24 may be shifted to vary as desired the clearance at 29 between the top flange and rotating brush. In Fig. 4 I show a variational form of adjustment for the support in which flanges 26a are pivotally mounted at 32 on the frame 12 so that the position of the support may be adjusted not only to vary the clearance at 29, but also to change the slope of the inclined surface 28a and correspondingly vary the depth of the trough formed by the support and forward brush. This type of adjustment has a particular advantage in that the pivot points 32 may be located, substantially as illustrated, so that within the normal range of adjustment movement of the member, no appreciable variation will occur in the spacing or clearance at 33 between the forward edge of the surface 28a and the brush 16 ahead. Here the support may be releasably held in adjusted position by frame supported bolts 34 extending through arcuate slots 35 in flanges 26a, centered at the pivots 32.

It will be understood that the series 10 may include any desired number of alternate rolls and inclined supports, and that the machine may be adapted to different treatments of the fruit during its course of travel. For example, one section of the rolls and support series 10 may be used for brushing the fruit, with or without simultaneous washing, another section to drying, and still another section to applying a wax or other surface coating to the fruit, all of which will be apparent to those familiar with the art. As illustrative, over one section 10a of the series I may mount separate nozzle headers 36 from which water is sprayed downwardly against the fruit passing over the supports and rolls below. In this section, the supports 24a, instead of carrying brushes, may be formed simply of sheet metal or other metal providing smooth inclined surfaces 37 with downwardly curved flanges 38 at their lower ends. The inclination of the surfaces and their relative angularity with the brushes ahead produces sufficient wedging action to properly restrain rotation of the fruit against the rotating force applied by the brushes.

The fruit is advanced along its course of travel by force applied independently of the rolls 16 and supports 24, preferably by a series of traveling pushers carried on endless chains or belts 40 at opposite sides of the frame on sprockets or pulleys 41 and 42, the latter being driven by a chain connection 43 from a suitable power source. In the form of the invention shown in Fig. 1, the pushers may comprise brushes 44 of a type that has been employed in other apparatus and referred to as clean-out brushes, pivotally attached at 45 to the chain 40 and depending a short distance below the tops of rolls 16. Successive brushes 44 may be spaced apart any suitable distance such as, for example, substantially the spacing between four successive rolls 16. Upon traveling down the inclined surface 14 onto the first roll 16, the fruit overrides the roll either by virtue of the latter's rotation or by the force of one of the pusher brushes 44 advancing toward the roll, and immediately moves forward on the inclined support ahead into engagement with the second roll. On the average, the fruit will be two pieces deep (in the direction of travel) on the supports, the rear fruit acting to press the forward fruit against the roll and to retard its spinning tendency. Due to the pressure thus exerted by the fruit out of contact with rolls against the fruit engaging the rolls, it is found that increasing the quantity of fruit going through the machine will cause the rolls to more throughly brush or rub the fruit.

Forward movement of the pusher brushes 44 against the fruit applies sufficient force to cause the fruit to override the rotating brushes onto the support flanges 25b, the fruit then moving immediately down the bristle surface 28a into engagement with the next rotating brush. In this manner the period of contact between the fruit and the rotating brushes is prolonged, and the interval required for movement of the fruit between successive engagements with the rotating brushes, is reduced to a minimum.

The variational form of the invention shown in Fig. 5 differs from the previously described form principally with respect to the type and form of adjustment for varying the positions of the supports. Here the supports 45 positioned as before between the rotating brushes 46, comprise brushes 47 having bristles presenting an upper slightly inclined surface 48, a continuing surface 49 of greater slope, and a surface 50 of comparatively steep angularity extending in close proximity to the brush ahead. Brush 47 is carried by body 51, the upper flanged portion 52 of which is pivotally connected at 53 to the sides 54 of the frame. The supports 45 are interconnected so as to be simultaneously adjustable by movement about their respective pivots 53 and in the same direction and degree of adjustment, by a suitable operating mechanism 54a. Typically, the operating mechanism may comprise a bar 55 pivotally connected at 56 with the lower arms of bell cranks 57 rotatable about fixed pivots at 58. The upper arms of the bell cranks are pivotally connected at 59 with links 60 which have pivotal connections at 61 with the supports 45. The supports are simultaneously movable by operation of a lever 62 keyed at 63 to one of the bell crank shafts and movable between predetermined positions of adjustment as determined by the spacing of notches 64 in segment 65 and engageable by a spring pressed pawl 66 on the lever handle.

The fruit is advanced over the series of rolls and supports, as previously explained, by a series of pushers 67 retained within carriers 68 attached to the continuously driven chain 69. The carriers 68 have integral arms 70 provided with rollers 71 travelling on cam tracks 72 and 73 to maintain the pushers 67 in vertical position during their working travel, and swinging them to the upper positions illustrated during the course of their return travel. As will be observed, by reason of the relatively steep angularity of portion 49 of the brush surface, the fruit tends to more tightly engage the rotating brush ahead, and to have increased resistance to rotating during the time.

I claim:

1. Apparatus for treating rollable fruits and the like while advancing them in a course of travel, comprising a plurality of spaced rolls extending transversely of said course, means for rotating said rolls in the direction of travel of the fruit, stationary supports between said rolls and having below the tops thereof surfaces inclined in said direction to form troughs with the rolls, and means independent of said rolls and supports for advancing the fruit along said course so that the fruit overrides each roll and immediately moves down one of said inclined surfaces into engagement with the next succeeding roll, the last mentioned means operating also to press fruit in the bottoms of said troughs against both the rolls and surface of the supports to restrain rotation of the fruit and thereby considerably increase the rubbing action of the rolls against the fruit.

2. Apparatus for treating rollable fruits and the like while advancing them in a course of travel, comprising a plurality of spaced rolls extending transversely of said course, means for rotating said rolls in the direction of travel of the fruit, stationary supports between said rolls and having below the tops thereof surfaces inclined in said direction to form troughs with the rolls, and means traveling above said course engaging and advancing the fruit along said course and causing the fruit to override each roll and immediately move down one of said inclined surfaces into engagement with the next succeeding roll, the last mentioned means operating also to press fruit in the bottoms of said troughs against both the rolls and surfaces of the supports to restrain rotation of the fruit and thereby considerably increase the rubbing action of the rolls against the fruit.

3. Apparatus for treating rollable fruits and the like while advancing them in a course of travel, comprising a plurality of spaced brushes extending transversely of said course, means for rotating said brushes in the direction of travel of the fruit, stationary supports between said brushes and having below the tops thereof bristles presenting surfaces inclined in said direction to form troughs with the rolls, and means independent of said brushes and supports for advancing the fruit along said course so that the fruit is caused to override each brush and immediately move down one of said inclined surfaces into engagement with the next succeeding brush, the last mentioned means operating also to press fruit in the bottoms of said troughs against both the brushes and surfaces of the supports to restrain rotation of the fruit and thereby considerably increase the rubbing action of the brushes against the fruit.

4. Apparatus for treating rollable fruits and the like while advancing them in a course of travel, comprising a plurality of spaced brushes extending transversely of said course, means for rotating said brushes in the direction of travel of the fruit, stationary supports between said brushes and having below the tops thereof surfaces inclined in said direction to form troughs with the brushes, and means traveling above said course and engaging and advancing the fruit along said course and causing the fruit to override each brush and immediately move down one of said inclined surfaces into engagement with the next succeeding brush, the last mentioned means operating also to press fruit in the bottoms of said troughs against both the brushes and surfaces of the supports to restrain rotation of the fruit and thereby considerably increase the rubbing action of the brushes against the fruit.

5. Apparatus for treating rollable fruits and the like while advancing them in a course of travel, comprising spaced rolls extending transversely of said course, means for rotating said rolls in the direction of travel of the fruit, stationary supports between said rolls and having below the tops thereof surfaces inclined in said direction to form troughs with the rolls, means independent of said rolls and supports for advancing the fruit along said course so that the fruit overrides the rolls and immediately moves down said inclined surfaces into engagement with the succeeding rolls, the last mentioned means operating also to press fruit in the bottoms of said troughs against both the rolls and surfaces of the supports to restrain rotation of the fruit and thereby considerably increase the rubbing action of the rolls against the fruit, and means for adjusting the positions of said supports relative to the rolls to compensate for reduced diameters of the rolls resulting from wear.

6. Apparatus for treating rollable fruits and the like while advancing them in a course of travel, comprising a pair of spaced rolls extending transversely of said course, means for rotating said rolls in the direction of travel of the fruit, a stationary support between said rolls and having below the tops thereof a surface inclined in said direction to form a trough with one of the rolls, means independent of said rolls and support for advancing the fruit along said course so that the fruit overrides the first roll and immediately moves down said inclined surface into engagement with the other roll, the last mentioned means operating also to press fruit in the bottom of said trough against both the roll and surface of the support to restrain rotation of the fruit and thereby considerably increase the rubbing action of the roll against the fruit, and means for adjusting the position of said support to vary the spacing of the edge of said support from the adjacent roll to compensate for reduced diameters of the rolls resulting from wear.

7. Apparatus for treating rollable fruits and the like while advancing them in a course of travel, comprising a pair of spaced rolls extending transversely of said course, means for rotating said rolls in the direction of travel of the fruit, a stationary support between said rolls and having below the tops thereof a surface inclined in said direction to form a trough with one of the rolls, means independent of said rolls and support for advancing the fruit along said course so that the fruit overrides the first roll and immediately moves down said inclined surface into engagement with the other roll, the last mentioned means operating also to press fruit in the bottom of said trough against both the roll and surface of the support to restrain rotation of the fruit and thereby considerably increase the rubbing action of the roll against the fruit, and means for adjusting the inclination of said surface of the support to correspondingly vary the depth of said trough and the angularity of said surface with relation to the roll.

8. Apparatus for treating rollable fruits and the like while advancing them in a course of travel, comprising a pair of brushes extending transversely of said course, means for rotating said brushes in the direction of travel of the fruit, a stationary support between said brushes and presenting below the tops of said brushes a bristle surface inclined in said direction to form a trough with one of the brushes, said body of the support overlying and having narrow clearance from one of the brushes, means for adjusting the support to vary that clearance to compensate for brush wear, and means traveling above said course for advancing the fruit along said course so that the fruit overrides the first brush and immediately moves down said inclined surface into engagement with the other brush, the last mentioned means operating also to press fruit in the bottom of said trough against both the brush and surface of the support to restrain rotation of the fruit and thereby considerably increase the rubbing action of the brush against the fruit.

THOMAS G. CUNNING.